(12) United States Patent
Wang et al.

(10) Patent No.: US 8,023,486 B2
(45) Date of Patent: Sep. 20, 2011

(54) MULTICELL JOINT DETECTION METHOD IN SLOTTED CODE DIVISION MULTIPLE ACCESS SYSTEM

(75) Inventors: Yingmin Wang, Beijing (CN); Nan Zhong, Beijing (CN); Shiyan Ren, Beijing (CN); Ning Liu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 1040 days.

(21) Appl. No.: 11/663,789

(22) PCT Filed: Sep. 22, 2005

(86) PCT No.: PCT/CN2005/001539
§ 371 (c)(1),
(2), (4) Date: Sep. 14, 2007

(87) PCT Pub. No.: WO2006/032211
PCT Pub. Date: Mar. 30, 2006

(65) Prior Publication Data
US 2008/0123611 A1    May 29, 2008

(30) Foreign Application Priority Data
Sep. 24, 2004 (CN) .......................... 2004 1 0080196

(51) Int. Cl.
*H04B 7/216* (2006.01)
(52) U.S. Cl. .................... 370/342; 370/441; 370/479
(58) Field of Classification Search .................. 370/331, 370/441
See application file for complete search history.

(56) References Cited

U.S. PATENT DOCUMENTS

| | | | | |
|---|---|---|---|---|
| 2003/0128679 | A1* | 7/2003 | Ishiguro et al. | 370/335 |
| 2004/0052236 | A1* | 3/2004 | Hwang et al. | 370/342 |
| 2004/0116122 | A1* | 6/2004 | Zeira et al. | 455/445 |
| 2005/0111408 | A1* | 5/2005 | Skillermark et al. | 370/331 |

FOREIGN PATENT DOCUMENTS

| | | |
|---|---|---|
| CN | 1520077 | 8/2004 |
| WO | WO01/69801 | 9/2001 |
| WO | WO03/017511 | 2/2003 |

* cited by examiner

*Primary Examiner* — Derrick Ferris
*Assistant Examiner* — Matthew Hopkins
(74) *Attorney, Agent, or Firm* — Merchant & Gould P.C.

(57) ABSTRACT

The present invention is directed to a multicell joint detection method, it deals against the interference between same frequency neighboring cell's signals in slotted CDMA system, and provides a joint detection method based on the multicell structure information. The method includes the steps of: using channel estimation of multi-set of codes to obtain channel estimation results of each neighboring cell; grouping each neighboring cell's code channel, including grouping based on the code channel's cell, grouping based on the code channnel's power or amplitude intensity, grouping based on the code channel's pertinence, and mixed grouping based on the above methods; making use of the channel estimation result and the result of code channel grouping to process the joint detection and output the detection data. This method makes full use of the structure information of each multicells signal, and efficiently restrains the multiple-access interference of the same frequency neighboring cell. This method can be used in slotted CDMA system or wireless communicataion system with similar signal structure.

14 Claims, 3 Drawing Sheets

--Prior Art--

MULTICELL JOINT DETECTION METHOD IN SLOTTED CODE DIVISION MULTIPLE ACCESS SYSTEM

FIELD OF THE INVENTION

The present invention relates to a joint detection method in mobile communication techniques fields, and more particularly to a multi-cell joint detection method for a slot Code Division Multiple Access (CDMA) system or for a wireless communication system adopting a signal structure similar with that of a slot CDMA system.

BACKGROUND OF THE INVENTION

Severe multi-address interference and inter-symbol interference exist in CDMA mobile communication systems. In a slot CDMA system, a joint detection method can be used to eliminate the multi-address interference and inter-symbol interference for a received local cell signal. The joint detection method takes a signal detection process as a unified inter-related joint detection process by using transmission signals and channel response information of all users in the local cell. Since the joint detection technology effectively restrains the inter-symbol interference and the multi-address interference in the local cell, performance of the CDMA system is improved greatly.

A time division-synchronous code division multi-address (TD-SCDMA) system is a kind of slot CDMA system adopting the joint detection solution for multi-user signal in the local cell. In a TD-SCDMA system, a structure of a burst signal in a normal slot is shown in FIG. 1, wherein a midamble (also called channel estimation code) in the middle of the burst signal is used for channel estimation and the data block at the two sides of the burst signal are used for service data transmission.

A detailed process of a single cell joint detection in the TD-SCDMA system is as follows:

Firstly a signal model received by a single cell receiver in a slot CDMA system is obtained.

$$e = Ad + n \quad (1)$$

In the above formula (1), e represents sampled data of a signal received by the receiver, d represents transmitted data, n represents a received noise and matrix A is a transmission matrix. The transmission matrix A is composed of a combined response vector $b^{(k)}$ of each code channel, wherein assuming there are K code channels all together and k represents a serial number of the code channel (the matrix A can be computed according to $b^{(k)}$ and $b^{(k)}$ is a column in each block distributed on a diagonal of the matrix.).

Each vector $b^{(k)}$ corresponds to a combined channel response of a user code channel whose serial number is k.

$$b^{(k)} = C^{(k)} \oplus h^{(k)} \quad k=1 \ldots K \quad (2)$$

In the above formula (2), $C^{(k)}$ is a spreading code of the user code channel whose serial number is k, $\oplus$ is a convolution operator and $h^{(k)}$ is a channel response of the user code channel whose serial number is k and $h^{(k)}$ is obtained by performing channel estimation with the midamble.

Then the joint detection can be performed with the above information. There are many kinds of joint detection algorithm. The joint detection algorithm can be an interference cancellation method or a block linear equalizer method or a combination of the two methods. For the block linear equalizer method, a soft output value estimated by demodulated transmitted data d is:

$$\hat{d} = (T)^{-1} A^{*T} R_n^{-1} e \quad (3)$$

The matrix T is obtained from the following formula:

$$T = \begin{cases} I & MF \\ A^{*T} R_n^{-1} A & ZF-BLE \\ A^{*T} R_n^{-1} A + R_d^{-1} & MMSE-BLE \end{cases} \quad (4)$$

In the above formula, $*T$ is a conjugation transposition; $R_d = E\{d \cdot d^{*T}\}$ is a covariance matrix of a data sequence d; for independent data sequence, $R_d = I$; and $R_n = E\{n \cdot n^{*T}\}$ is a covariance matrix of the noise sequence n. For independent and stable noise sequence (such as white noise), $Rn = \sigma^2 I$, wherein I represents a unit matrix.

In the case of $R_d = I$ and $Rn = \sigma^2 I$, formulae (3) and (4) can be simplified as:

$$\hat{d} = (T)^{-1} A^{*T} e \quad (5)$$

$$T = \begin{cases} I & MF \\ A^{*T} A & ZF-BLE \\ A^{*T} A + \sigma^2 I & MMSE-BLE \end{cases} \quad (6)$$

The MF in formulae (4) and (6) is matching-filter corresponding to a matching-filter method; ZF-BLE is a Zero-Forcing Block Linear Equalizer method corresponding to a maximum likelihood linear solution; MMSE-BLE is a Minimum Mean Square Error Block Linear Equalizer method corresponding to a minimum mean square linear solution. Any one of the above three methods for obtaining T can be used and generally the ZF-BLE or the MMSE-BLE method is selected.

The single cell joint detection method uses the structure information of signals (including the spreading code and the channel response) transmitted by all the users in the cell, i.e. uses the structure information of signals in the local cell. At this time, the detection method processes the interference signals from other cells as the Gauss white noise of the time, therefore, the single cell joint detection method is more effective in restraining the inter-symbol interference and multi-address interference in the local cell. The single cell joint detection method can greatly improve the system performance for a single cell or for a CDMA system adopting inter-frequency networking.

For a slot CDMA system adopting same frequency network for neighboring cells, the single cell joint detection method can also improve the system performance. However, in the case of the same frequency network, there is strong interference between signals from intra-frequency neighboring cells. The interference between signals from intra-frequency neighboring cells impacts the system performance greatly. Especially at the border place of intra-frequency neighboring cells, the intra-frequency interference is generally the most important interference. At this time, the single cell joint detection method cannot restrain the intra-frequency neighboring cell interference so when the intra-frequency neighboring cell interference exists, the system performance will decrease greatly.

For example, when users, at the border place of cells, of intra-frequency neighboring cells work on several code channels, especially when the system is one with a small spreading gain, the signals of the intra-frequency neighboring cell users will highly interfere the signal of the local cell. In this case, the single cell joint detection method will deteriorate the system performance extremely.

Thus, when the slot CDMA cellular mobile communication system works in intra-frequency neighboring cells, the single cell joint detection method will cause the deterioration of the system performance, so there is a need for providing a better joint detection method that can enable better system performance. If the joint detection method can be extended from a single cell to intra-frequency multiple cells by using the structure information of the intra-frequency neighboring cells, the performance of the slot CDMA system in same frequency network will be improved greatly.

In order to obtain the structure information of the intra-frequency neighboring cells except that of the local cell, much apriori information is needed, wherein a kind of important apriori information is the channel estimation result of the intra-frequency neighboring cells except the local cell, i.e. multi-cell channel estimation result. Since when generating the channel estimation code, each neighboring cell takes a different midamble as a basic code and different users in the cell use cyclic shift versions of this basic code as their channel estimation codes. Thus, the different cyclic shift versions of the basic code of one cell can be called a code set, multiple cells have multiple code sets and the channel estimation of the multiple code sets is that of the multiple cells.

In the Chinese patent application "a multiple code set channel estimation method for a slot CDMA system" with the application No. 03100670.1, a multi-cell estimation method for a slot CDMA system is disclosed.

The above mentioned technical solution performs finite time decision processing for the single code set channel estimation result and only keeps finite taps with stronger signal responses so as to recover interference signals of other code sets, to cancel the interference signals, to obtain net signals of every code set, and to perform the single code set channel estimation for the net signal of each code set. The above processing is repeated for iterative times and then multiple code set (multi-cell) channel estimation result is outputted.

SUMMARY OF THE INVENTION

The object of the present invention is to provide a multi-cell joint detection method for a slot CDMA system. This method realizes a multi-cell joint detection using structure information of multiple cells aiming at intra-frequency neighboring cell interference. The method provided by the present invention may greatly improve a system performance when the slot CDMA system works in the intra-frequency neighboring cells.

The technical solution realizing the object of the present invention is a multi-cell joint detection method for a slot CDMA system, which performing a joint detection by using structure information of multiple intra-frequency neighboring cells. The method includes steps of:

obtaining a channel estimation result of each neighboring cell by using multiple code set channel estimation method;

selecting at least one grouping method from predetermined code channel grouping methods and grouping code channels of each neighboring cell;

performing the joint detection based on the channel estimation result of each neighboring cell and the code channel grouping result with joint detection method so as to obtain detected data.

The present invention obtains the channel estimation result of each neighboring cell by using the multiple code set channel estimation method; grouping code channels of each neighboring cell according to the grouping method of the present invention performing joint detection by using the channel estimation result and the code channel grouping result. The grouping method includes grouping based on the cell having the code channel, grouping based on the strength of the code channel power or amplitude, grouping based on the strength of the code channel correlation, and grouping using the combination of the above; A process of the joint detection includes constructing matrix A, performing matched-filtering, and finishing a multi-cell joint detection. When different code channel grouping methods are used, the matrix A will be different so there are differences when using channel estimation result and code channel grouping result to perform the joint detection.

The method provided by the present invention can make the joint detection method available to intra-frequency multi-cell slot CDMA system. Compared with the single cell joint detection method, the method of the present invention can make full use of structure information of multiple cell signals and perform the multi-cell joint detection so as to highly restrain the multi-address interference between intra-frequency neighboring cells. The method provided by the present invention can greatly improve the performance of the slot CDMA system when the system works in intra-frequency neighboring cells.

DETAILED DESCRIPTION OF THE INVENTION

Figure 1:
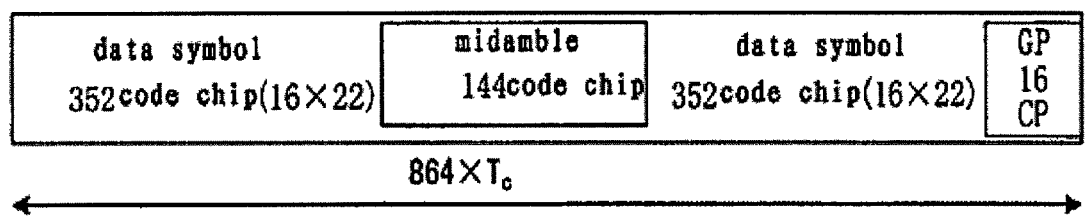
FIG. 1 is a diagram showing a slot burst structure of a TD-SCDMA service.
Figure 1:
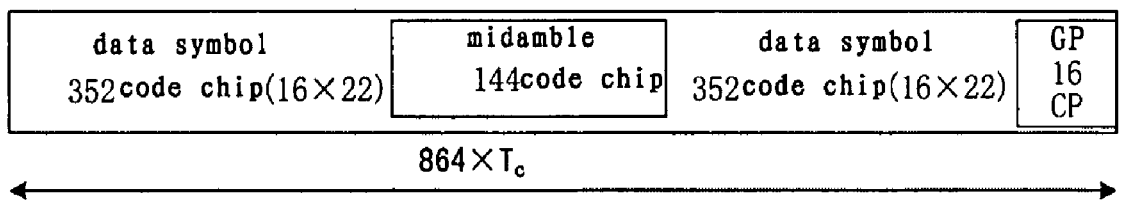

The present invention provides a joint detection method based on multi-cell structure information taking account in interferences of signals between intra-frequency neighboring cells in a slot CDMA system. Details of the method are shown as in FIG. 2.

First step is multi-cell channel estimation. The channel estimation result of each neighboring cell is obtained by the aforementioned multiple code set channel estimation method. Since when generating the channel estimation code, each neighboring cell takes a different midamble as a basic code and different users in the cell use different cyclic shift versions of this basic code as their channel estimation codes. Thus, all the different cyclic shift versions of the basic code of one cell are called a code set, multiple cells have multiple code sets and the channel estimations of the multiple code sets are those of the multiple cells. The multi-cell channel estimation of the present invention makes use of the multiple code set channel estimation technology provided in the patent application No. 031006701, adopts a multiple code set joint channel iterative estimation method based on a finite time location decision feedback processing in a case that response signal of the multiple code set channel estimation code exists in intra-frequency multiple cells, and obtains channel estimation result of multiple cells. The multiple cells for which channel estimations have been performed are neighboring ones and include a local cell to which the detection user belongs and a cell which is most close to the local cell in geography.

Second step is code channel grouping. Firstly a code channel grouping method is determined. Then code channels grouping is performed for code channels of each neighboring cell according to the selected grouping method. Technical solutions for determining the code channel grouping are as follows:

First solution is a grouping method based on the cell to which the code channel belongs. The number of the groups is the same as the number of the intra-frequencys so the code channel in each group is the one of the corresponding cell.

Second solution is a grouping method based on the code channel power or amplitude. A combined channel response of each code channel can be obtained by using the multi-cell channel estimation result, or the amplitude or power (power can be acquired with the square of the amplitude) of each code channel can be estimated according to the output of each code channel matched-filtering, and then the code channels are grouped according to the strength of the amplitude or the power. For example, a threshold of the amplitude or of the power is determined and the code channel is strong if its signal amplitude or power is higher than the threshold, and is weak if its signal amplitude or power is lower than the threshold. Strong code channels belong to a group and weak ones belong to another group.

Third solution is a grouping method based on the code channel correlation. Firstly a combined channel response of each code channel is obtained by using the multi-cell channel estimation result; the correlation between any two of code channels of the multi-cell signals is estimated by using the combined channel response of each code channel and then all the code channels are grouped according to the strength of the correlations. For example, a correlation threshold is determined and the code channel is strong if its correlation is higher than the threshold, and is weak if its correlation is lower than the threshold. Strong code channels belong to a group and weak ones belong to another group. The correlations among multiple code channels can be an average correlation, maximum correlation or minimum correlation.

A mixture of the above methods can also be used or the code channels can be grouped based on other principles.

Third step is joint detection. The joint detection is performed based on the multi-cell channel estimation result and the code channel grouping result so that the multi-cell joint detection result is obtained.

As discussed above, the joint detection method can be an interference cancellation method or a block linear equalizer method or a combination of the two methods. For example, the block linear equalizer method can be used in each group and the interference cancellation method can be used between different code channel groups.

It is to be noted that, in the multi-cell joint detection method of the present invention, the code channels to be grouped can be those pre-allocated by each neighboring cell (grouping without activation processing) and also can be activated code channels remained after the activation processing is performed for all the code channels of neighboring cells (grouping after activation processing). Similarly, the code channels for which the joint detection will be performed can be those pre-allocated by each neighboring cell (performing joint detection according to the code channel grouping without activation processing) and also can be the activated code channels remained after the activation processing is performed for all the code channels of neighboring cells (performing joint detection according to the code channel grouping after activation processing). A second activation processing can be implemented, i.e. the activated code channels subject to a first activation processing before grouping will be matching filtered after grouping and then will be subject to a second activation processing. The joint detection is performed for the code channels subject to the second activation processing.

Another significance of grouping the code channels in the present invention is that: since when intra-frequency neighboring cells are in work and a lot of code channels are allocated to multiple neighboring cells, an activation processing can be performed for these code channels firstly and there are still a lot of activated code channels. In order to perform the joint detection at lower cost and with better performance, the remained activated code channels subject to the activation processing are grouped and then the joint detection method is further performed.

Figure 3:
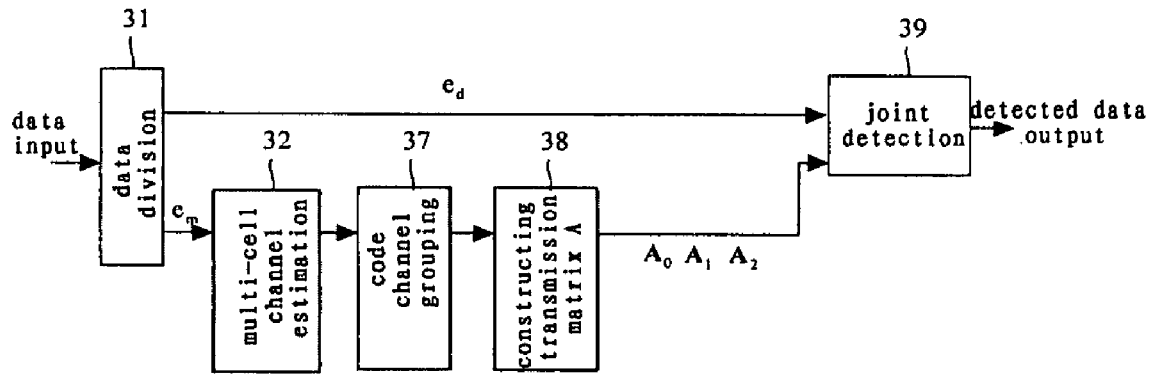
FIG. 3 is a flowchart showing a multi-cell joint detection based on a cell code channel grouping according to an embodiment of the invention.

The realization of the present invention in the case of code channel grouping based on cells is described in details with reference to FIG. 3 and taking an example of three intra-frequency neighboring cells.

According to the principle in formula (1), the multi-user signal of the local cell and the two intra-frequency cells can be represented as:

$$e = A_0 d_0 + \sum_{i=1}^{2} A_i d_i + n_0 \tag{7}$$

In the above formula, $A_0$ and $d_0$ are the transmission matrix and the transmitted data of the user in the local cell respectively; $A_i$ and $d_i$ are the transmission matrix and the transmitted data in the $i^{th}$ (i=1,2) neighboring cell respectively; $n_0$ is the interference and noise power (such as the white noise) after the interference of the two neighboring cells are eliminated.

In step 31, the multi-user signal e is divided into different parts of data, i.e. the normal slot burst structure in FIG. 1 is divided, the middle part em (received signal of the midamble or response signal of the channel estimation code) is then subject to the multi-cell channel estimation and the divided data symbol part $e_d$ is then subject to the matched-filtering.

In step 32, the multi-cell channel estimation is performed. The channel estimation code parts of the three intra-frequency cells correspond to the channel estimation code signals $e_{m1}$, $e_{m2}$, $e_{m3}$ of the three code sets, so the received total channel estimation code part is $e_m = e_{m1} + e_{m2} + e_{m3}$. Then $e_m$ is subject to the multiple code set channel estimation method and the channel estimation result of the three intra-frequency neighboring cells is obtained (as to the specific method, please refer to "a multiple code set channel estimation method for a slot CDMA system" filed on May 09, 2003 with the application No. CN03100670.1).

In step 37, the code channels are grouped. In this case, the code channels of the three cells are grouped.

The code channels can be grouped into three groups corresponding to the number of the cells if adopting the first grouping method based on the cell to which the code channel belongs. According to the principle of formula (7), the received signal $e_d$ of all the grouped data symbols can be represented as:

$$e_d = A_0 d_0 + A_1 d_1 + A_2 d_2 + n_0 \tag{8}$$

In step 38, $b^{(k)}$ is used to construct the transmission matrix A in formulae (8)-(10) (according to formula (2), $b^{(k)}$ can be obtained from $h^{(k)}$). According to the first grouping method, the corresponding transmission matrix A in formulae (8)-(10) is constructed. Since the first grouping method is adopted, the constructed transmission matrix A is the transmission matrixes $A_0$, $A_1$, and $A_2$ of the three cells. Then the three transmission matrixes are forwarded to step 39 respectively for the joint detection.

In step 39 the multi-cell joint detection is completed finally. The joint detection can adopt the "block linear equalizer+ interference cancellation" method, i.e. the block linear equalizer method is adopted in the three groups and the interference cancellation method is adopted between any two of the three groups. Step 39 includes the following sub-steps.

1) The block linear equalizer method is used to detect the data symbol received signal $e_d$ for each group, i.e. each group is detected with the single cell joint detection method. According to formula (8), $e_d = A_0 d_0 + A_1 d_1 + A_2 d_2 + n_0$. When the single cell joint detection is performed for the interference cell 1, it can be true that $e_d = A_1 d_1 + (A_0 d_0 + A_2 d_2 + n_0) = A_1 d_1 + n_1$, wherein $n_1$ is the interference of signals in non-interfering cell 1. $d_1$ can be obtained according to the single cell joint detection method (formula (3)) and $d_2$ can be obtained in the same way.

2) Interference recovery is performed based on the detected result of each group, and interferences $A_1 d_1$ and $A_2 d_2$ to the user in the local cell from the interfering cell 1 and 2 are obtained respectively.

3) Interferences $A_1 d_1$ and $A_2 d_2$ that are not the interferences to the current group are cancelled from the total data symbol received signal ed and the net signal of the current group is obtained according to $A_0 d_0 + n_0 = e_d - (A_1 d_1 + A_2 d_2)$.

4) The block linear equalizer method is performed for the net signal of the group to which the user (or users) to be detected belongs and the transmit signal result do of the user to be detected is obtained (formula (3)). Compared with the do obtained in step 1) with the single cell joint detection method, the obtained $d_0$ here is of more accuracy since the intra-frequency neighboring cell interference is eliminated.

The above process only uses the interference cancellation processing once, but also can use the interference cancellation processing for multiple times. The implementation of cancellation once or multiple times can be realized by setting iterative times and cyclically performing "block linear equalizer+interference cancellation". The iterative times refer to the interference cancellation times. The detailed process includes the following steps.

a) The single cell joint detection is performed for each code channel group with the block linear equalizer method and the joint detection result of each group is detected. Then the determination is made as to whether reaches the iterative times, if yes, outputting the joint detection result of the group to which the user (or users) to be detected belongs, otherwise proceeding to step b);

b) Interference components introduced by respective group signal response are recovered according to the joint detection result of each group;

c) The interference components that don't belong to the current group are cancelled from the received signal to obtain the net signal of each group;

d) The net signal is considered as the grouping result for the subsequent processing and then the process returns to step a).

The above block linear equalizer method obtains the detected data according to formula (3) and e in formula (3) represents the net signal after the interference is cancelled.

The implementation process of the present invention which is based on the code channel amplitude or the power grouping or based on the code channel correlation grouping will be described in details with reference to FIG. 4.

Figure 4:
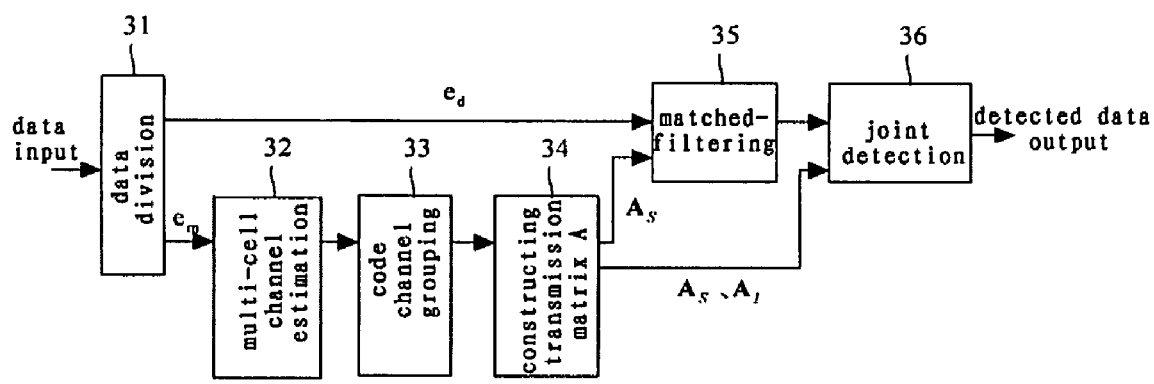
FIG. 4 is a flowchart showing a multi-cell joint detection based on a code channel amplitude or power grouping or based on a code channel correlation grouping according to an embodiment of the invention.

FIG. 4 shows step 31 and 32 are the same with those in FIG. 3. In step 33, if the grouping method based on the code channel amplitude or the power is adopted, the combined channel response of each code channel is obtained from the channel estimation result and then the amplitude or power of each code channel signal is estimated or the power of each code channel signal is estimated from the output result of each code channel matched-filtering; then all the code channels are divided into two groups according to the power strength, wherein the code channel of the user (or users) to be detected joint detection) and the interference code channel with stronger power are allocated to a code channel group for which the joint detection will be performed, and the interference code channels which don't include code channels of a user to be detected and whose amplitude or power are less than the threshold are allocated to an interference code channel group. The interference code channels refer to other user code channels except those to be detected, which include other user code channels of the local cell and those of the intra-frequency neighboring cells. According to the principle of formula (7), the data symbol total received signal ed after grouping can be represented as:

$$e_d = A_S d_S + (A_I d_I + n_0) \quad (9)$$

In the above formula, $A_S$ and $d_S$ are the transmission matrix and transmitted data of the code channel group will be subject to the joint detection; $A_I$ and $d_I$ are the transmission matrix and transmitted data of the interference code channel group.

If the grouping method based on the code channel correlation is adopted, the combined channel response of each code channel is obtained from the channel estimation result of each neighboring cell and thus the average value of the correlation between all the code channels of the user (or users) not to be detected and the code channels of the user (or users) to be detected; then all the code channels are divided into two groups according to the strength of the average value of the correlation, wherein all the code channels of the user to be detected and the code channels having stronger average correlation with all the code channels of the user to be detected are allocated to the code channel group for which the joint detection will be performed, the rest code channels which don't include code channels of the user (or users) to be detected and code channels with weaker average correlation are allocated to the interference code channel group. According to formula (7), the data symbol total received signal ed after grouping can be represented as:

$$e_d = A_S d_S + (A_I d_I + n_0) \quad (10)$$

In the above formula, $A_S$ and $d_S$ are the transmission matrix and transmitted data of the code channel group to be subject to the joint detection; $A_I$ and $d_I$ are the transmission matrix and transmitted data of the interference code channel group (the same expression is used for the data symbol total received signal ed after grouping in the second and third grouping methods).

In step 34, $b^{(k)}$ is used to construct the transmission matrix A in formulae (8)-(10) ($b^{(k)}$ is obtained from $h^{(k)}$ according to formula (2)). Respective transmission matrix A in formulae (8)-(10) are constructed according to the adopted grouping method.

The respectively constructed transmission matrix A is $A_S$ (transmission matrix of the code channel group to be subject to the joint detection) and $A_I$ (transmission matrix of the interference code channel group not to be subject to the joint detection) respectively according to the second and third grouping methods.

$A_s$ is then subject to matched-filtering in step 35 and $A_S$ and $A_I$ are then subject to joint detection in step 36.

In step 35, the matched-filtering process in this step is the process of obtaining $A^{*T}R_n^{-1}e$ in formula (3) in which the soft output value estimated by transmitted data d is obtained. A is the constructed matrix and e is the divided data symbol part $e_d$. A in the matched-filtering process is $A_S$. $R_n$ is the covariance matrix of the coloured noise sequence n.

In step 36, the multi-cell joint detection is completed finally. According to different code channel grouping methods, different constructed transmission matrixes accomplish the multi-cell joint detection. In other words, T is obtained by one method in formula (4), based on $A^{*T}R_n^{-1}e_d$ obtained by matched-filtering $\hat{d}$ is obtained according to formula (3).

When adopting the second or third code channel grouping method, the block linear equalizer method is used to detect the code channel group for which the joint detection will be performed. $A_S$ and $A_I$ are obtained when constructing the transmission matrix A, wherein $A_S$ is the transmission matrix constructed by the code channels of the local user in the local cell and those with large power or correlation of the local cell or the neighboring cells and As is used for multi-user joint detection; $A_I$ is the transmission matrix constructed by the code channels of other users in the local cell and those with small power or correlation of the neighboring cells and $A_I$ is used for computing $R_n$.

Thus according to formula (3), the soft output value estimated by demodulated transmitted data $d_S$ is:

$$\hat{d}_S = (T_S)^{-1} A_S^{*T} R_n^{-1} e \quad (11)$$

Matrix $T_S$ is obtained according to the following formula (choosing any one of the methods):

$$T_S = \begin{cases} I & MF \\ A_S^{*T} R_n^{-1} A_S & ZF - BLE \\ A_S^{*T} R_n^{-1} A_S + R_d^{-1} & MMSE - BLE \end{cases} \quad (12)$$

The covariance matrix $R_n$ of the coloured noise interference can be computed according to the interference code channel group and the background noise and $R_n$ can be expressed as:

$$R_n = E\{n \cdot n^{*T}\} = E\{(A_I d_I + n_0) \cdot (A_I d_I + n_0)^{*T}\} = A_I A_I^{*T} + \sigma^2 I \quad (13)$$

Generally there are two methods to obtain $R_n$.

One method is to compute strictly according to formula (13). The transmission matrix $A_I$ of the interference code channel group is firstly constructed according to the combined channel responses of all interference code channels in the interference code channel group. Then $A_I A_I^{*T}$ and background noise power $\sigma^2$ are obtained and finally $R_n$ is obtained according to $R_n = A_I A_I^{*T} + \sigma^2 I$.

Another method is a simplified processing regarding the intra-frequency interference in the interference code channel group as the white noise as shown in Formula 14:

$$R_n = E\{n \cdot n^{*T}\} = E\{(A_I d_I + n_0) \cdot (A_I d_I + n_0)^{*T}\} = A_I A_I^{*T} + \sigma^2 I \approx \sigma_I^2 I + \sigma^2 I = (\sigma_I^2 + \sigma^2) I \quad (14)$$

$\sigma_I^2$ ($\sigma_I^2 I$ is the diagonal matrix of $A_I A_I^{*T}$) is obtained by summing the power of each code channel in the interference code channel group. Then the background noise power $\sigma^2$ is computed and finally $R_n$ is obtained according to $R_n = (\sigma_I^2 + \sigma^2) I$.

Figure 2:
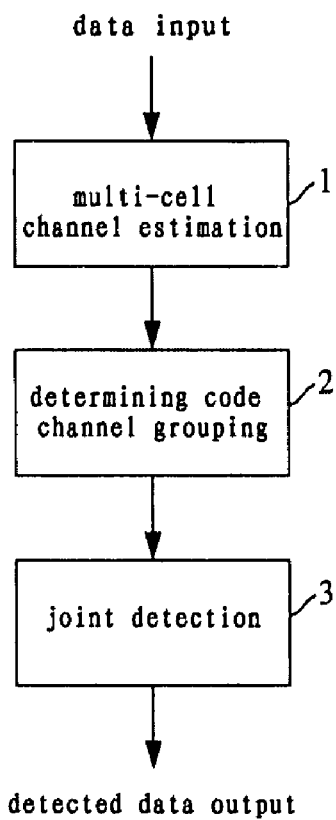
FIG. 2 is a schematic block diagram showing a flow of a multi-cell joint detection of a slot CDMA system according to an embodiment of the invention.

Steps 32, 33, 34, 35 and 36 in FIG. 3 and steps 32, 37, 38 and 39 in FIG. 4 wholly represent the multi-cell joint detection process of the present invention, i.e. steps 1, 2 and 3 in FIG. 2.

The method of the present invention can be used in the slot CMDA system or the wireless communication system adopting the similar signal structure.

The invention claimed is:

1. A multi-cell joint detection method for, a slot code divisional multiple access (CDMA) system which performs joint detection by using structure information of multiple intra-frequency neighboring cells, comprising steps of:
   obtaining a channel estimation result of each neighboring cell by using multiple code set channel estimation method;
   selecting at least one grouping method from predetermined code channel grouping methods and grouping code channels of each neighboring cell;
   performing the joint detection based on the channel estimation result of each neighboring cell and a code channel grouping result so as to obtain a joint detection result;
   wherein the at least one grouping method selected is based on a respective cell and the grouping code channels of each neighboring cell comprises: grouping code channels of a same cell into one group, the number of groups is the same as the number of intra-frequency cells,
   wherein said performing the joint detection adopts the single cell block linear equalizer method in each of the groups and adopts the interference cancellation method between the groups, and said performing the joint detection further comprises steps of:
   performing single cell joint detection for each of the groups, obtaining detection result for each of the groups and then determining whether iterative times are reached;
   if yes, outputting a joint detection result of a group which a user to be detected belongs to;
   otherwise, recovering interference components introduced by each group signal response based on the joint detection result of each of the groups;
   cancelling interference components that don't belong to a current group from a received signal and obtaining a net signal of each of the group; and
   taking the net signal as a grouping result for next processing and then proceeding to the step of performing the single cell joint detection.

2. The method according to claim 1, wherein in the step of performing the single cell joint detection, a combined channel response of each code channel is computed according to the obtained channel estimation result of each neighboring cell, a transmission matrix of each neighboring cell is constructed according to the combined channel response, matched-filtering is performed according to the transmission matrix and data part divided from the received signal, and a joint detection result of each group is obtained by performing the single cell block linear equalizer for the matched-filtering result.

3. The method according to claim 1, wherein in the selecting and grouping step, the at least one grouping method selected is further based on a code channel amplitude or power, and the code channels are grouped into a code channel group to be subject to the joint detection and an interference code channel group according to strength of the code channel amplitude or power.

4. The method according to claim 3, wherein grouping the code channels according to the strength of the amplitude or the power comprises: estimating the amplitude or power of each code channel signal by obtaining the combined channel response of each code channel by using the neighboring cell channel estimation result or an output result of each code channel matched-filtering; and allocating code channels of a user to be detected and an interference code channel whose amplitude or power is higher than a threshold to the code channel group to be subject to joint detection, and allocating an interference code channels which do not include code channels of a user to be detected and whose amplitude or power are less than the threshold to an interference code channel group.

5. The method according to claim 3, wherein in the step of performing the joint detection, a block linear equalizer method is adopted to detect a code channel group to be subject to the joint detection.

6. The method according to claim 5, wherein in the step of performing the joint detection, adopting a block linear equalizer method to detect a code channel group to be subject to the joint detection further comprises:
   constructing a transmission matrix of the code channel group to be subject to the joint detection and a transmission matrix of the interference code channel group according to the combined channel response of each code channel;
   performing matched-filtering for the code channel group to be subject to the joint detection, covariance matrix of coloured noise interference and data part divided from the received signal; and
   performing joint-detection for the matched-filtering result with the block linear equalizer method and outputting a soft estimation value estimated by obtained transmitted data as detected data.

7. The method according to claim 6, wherein the covariance matrix of coloured noise interference in the step of matched-filtering is computed according to the interference code channel group and background noise, specifically according to the transmission matrix of the interference code channel group and the power of the background noise.

8. The method according to claim 6, wherein the covariance matrix of coloured noise interference in the step of matched-filtering is computed according to the interference code channel group and background noise, wherein the intra-frequency interference in the interference code channel group is regarded as white noise, in which a sum of power of each code channel in the interference code channel group is computed and a sum of the sum of the power and the power of the background noise is computed as the covariance matrix.

9. The method according to claim 1, wherein in the selecting and grouping step, the at least one grouping method selected is further based on a code channel correlation, and the code channels are grouped into a code channel group to be subject to the joint detection and an interference code channel group according to strength of code channel correlation.

10. The method according to claim 9, wherein grouping the code channels according to the strength of the code channel correlation comprises: obtaining a combined channel response of each code channel by using the neighboring cell channel estimation result and estimating the correlation between code channels in neighboring cell signals; allocating a code channel of a user to be detected and an interference code channel whose correlation is higher than a threshold to the code channel group to be subject to the joint detection, and allocating interference code channels which do not include code channels of a user to be detected and whose correlation are less than the threshold to an interference code channel group.

11. The method according to claim 10, wherein the correlation between the code channels comprises average correlation, maximum correlation and minimum correlation, one of which is selected for grouping according to the strength of the correlation.

12. The method according to claim 1, wherein in the selecting and grouping step, the code channels to be subject to the code channel grouping are code channels pre-allocated by each neighboring cell or activated code channels remained after an activation processing is performed for all the code channels of each neighboring cells.

13. The method according to claim 1, wherein in the step of performing the joint detection, the code channels to be subject to the joint detection are code channels pre-allocated by each neighboring cell or activated code channels remained after an activation processing is performed for all the code channels of each neighboring cells.

14. The method according to claim 1, wherein in the selecting and grouping step, an activation processing is performed for all the code channels of each neighboring cell and the remained activated code channels are used for the code channel grouping; in the step of performing the joint detection, the activation processing is performed once again for all the activated code channels of each neighboring cell and thus the remained activated code channels are used for the joint detection.

* * * * *